US 6,713,037 B2

(12) United States Patent
Van Neste

(10) Patent No.: US 6,713,037 B2
(45) Date of Patent: Mar. 30, 2004

(54) PROCESS FOR SYNTHESIZING NONCRYSTALLINE LITHIUM BASED MIXED OXIDES BY HIGH ENERGY MILLING

(75) Inventor: Andre Van Neste, Quebec (CA)

(73) Assignee: Nanox, Inc., Quebec (CA)

( * ) Notice: Subject to any disclaimer, the term of this patent is extended or adjusted under 35 U.S.C. 154(b) by 0 days.

(21) Appl. No.: 10/261,540

(22) Filed: Sep. 30, 2002

(65) Prior Publication Data

US 2003/0082098 A1 May 1, 2003

Related U.S. Application Data

(60) Provisional application No. 60/325,516, filed on Sep. 28, 2001.

(51) Int. Cl.[7] .......................... C01D 1/02; C01G 45/02; C01G 23/04; C01F 7/02
(52) U.S. Cl. .............................. 423/594.15; 423/594.2; 423/594.4; 423/594.6; 423/596; 423/599; 423/598; 423/600
(58) Field of Search ................................. 423/596, 599, 423/598, 600, 641, 593.1, 594.15, 594.2, 594.4, 594.6

(56) References Cited

U.S. PATENT DOCUMENTS

| | | | | | |
|---|---|---|---|---|---|
| 4,065,544 A | * | 12/1977 | Hamling et al. | ............. | 423/252 |
| 4,409,038 A | * | 10/1983 | Weber | ....................... | 148/12.7 |
| 5,900,223 A | * | 5/1999 | Matijevic et al. | ........... | 423/263 |
| 6,017,504 A | * | 1/2000 | Kaliaguine et al. | ......... | 423/263 |
| 6,403,257 B1 | * | 6/2002 | Christian et al. | ........... | 429/224 |
| 6,444,009 B1 | * | 9/2002 | Liu et al. | ...................... | 75/332 |
| 6,447,739 B1 | * | 9/2002 | Krynitz et al. | ........... | 423/179.5 |

* cited by examiner

*Primary Examiner*—Stanley S. Silverman
*Assistant Examiner*—Jonas N. Strickland
(74) *Attorney, Agent, or Firm*—Gardner Groff, P.C.

(57) ABSTRACT

A process method for producing a lithium based mixed oxide of the formula $LiM'_x \ldots O_y$ through the steps of combining a lithium oxide with a second oxide having the base metal element (M') at room temperature; and applying to the combination, a high energy milling process, wherein the high energy milling process obtains, without the addition of substantial external heat being added to the synthesis, a chemical synthesis of a composite oxide of the above formula, having crystallites of nanometer dimension.

16 Claims, 5 Drawing Sheets

PROCESS FOR SYNTHESIZING NONCRYSTALLINE LITHIUM BASED MIXED OXIDES BY HIGH ENERGY MILLING

CROSS REFERENCE TO RELATED APPLICATION

The present non-provisional patent application claims priority of U.S. Provisional Application Ser. No. 60/325,516, filed on Sep. 28, 2001 which is hereby incorporated herein by reference in its entirety.

FIELD OF THE INVENTION

The invention disclosed herein relates to a method for the synthesis of lithium based mixed oxides, from their elementary oxides, by subjecting them to a high energy milling process, that is a mechano-chemical synthesis creating the lithium based mixed oxides.

BACKGROUND OF THE INVENTION

Lithium based mixed oxides of the formula Li $M'_{x'} M''_{x''} \ldots O_y$ have recently found many uses. These oxides are mainly used in the field of rechargeable lithium batteries and, additionally, may be used as cathode materials.

Conventional methods of synthesis of lithium based mixed oxides of the formula $LiM'_{x'} M''_{x''} \ldots O_y$ are usually based on chemical synthetic methods of solutions, precipitations, gels, etc. Even more commonly, these methods of the synthesis of lithium based mixed oxides are based on synthetic methods of the ceramic type, in which the base materials are intimately mixed in the required proportions and heated for solid state reactions and sintered for a requisite period of time at a high temperature, usually in the range of one thousand degrees Celsius. This, of course, requires very specialized equipment and conditions, and the extremely high-energy heat inputs associated with the conventional synthesis of the lithium based mixed oxides.

Accordingly, there is presently a need for a low heat energy input process for the synthesis of lithium based mixed oxides, which is simple, economical, and operable at room temperature conditions.

Therefore, a feature of the present invention is to assist in providing a process to create a lithium based mixed oxide at room temperature without requiring the addition of substantial external heating.

Another feature of the present invention is to assist in providing a process to create a lithium based mixed oxide utilizing high energy milling.

Another feature of the present invention is to provide an economic process for creating a lithium based mixed oxide.

Yet another feature of the present invention is to assist in providing a process to create a lithium based mixed oxide with multiple base metals other than lithium.

Still yet another feature of the present invention is to assist in providing a process to create a lithium based mixed oxide wherein one of the multiple base metals, other than lithium, is received, or incorporated, from the material of the crucible utilized in the high energy milling process.

SUMMARY OF THE INVENTION

The present invention relates to the synthesis of lithium based mixed oxides of the above formula from their elementary oxides by subjecting them, for a certain period of time and at room temperature, to a high energy milling process, or mechano-synthesis. By such method, it is possible to obtain composite oxides having crystallites of nanometer dimensions, that being approximately 100 nanometers or less in dimension, by way of a true chemical synthesis without addition of heating, as occurs in conventional synthesis methods.

The present invention is a process for the production of a lithium based mixed oxides of formula ($LiM'_{x'} \ldots O_y$) which may be conducted at room temperature, in a process which is simple, economical, and requires no prior heating to obtain the starting mixed oxide structure. A lithium oxide and a second and subsequent oxide having a base metal element (M') as well as the additional metal elements of (M", M''' . . . ) present, are combined at room temperature using a high energy milling process applied at a controlled atmosphere and without substantially extraneous heat added to the synthesis. The milling is performed until the synthesis produces a lithium based mixed oxide having crystallites of nanometer dimension. It is preferable to have a controlled atmosphere wherein oxygen availability is controlled. This can be accomplished by using an argon gas atmosphere.

Preferably, the metal based elements are selected from the group comprising Ti, V, Cr, Mn, Fe, Co, Ni, Cu, Al and Mg. The lithium based mixed oxide can be of the formula ($LiM'_{x'} M''_{x''} \ldots O_y$), where the lithium oxide has at least one base metal other than lithium. One of these base metals can be partially or completely received, or incorporated, from the crucible utilized for the high energy milling process. As well, the synthesis x', x" and so on and y represent the atomic fraction of the metals in the mixed oxide and of the oxygen respectively. It is also preferable that one of the base elements, of either of the above equations, is cobalt.

An alternative aspect of the present invention is providing a method of manufacturing a lithium based mixed oxide having the steps of combining a lithium based powder and a second base metal oxide powder. These combined powders are then high energy milled. This milling is a controlled milling having a substantially controlled atmosphere, without the addition of substantial extraneous heat, and is performed until the lithium based mixed oxide has crystallites of substantially nanometer dimension. An atmosphere of argon gas may be used as the controlled atmosphere. It is preferred for the second and subsequent base metal oxide powder to have an element selected from the group of: Ti, V, Cr, Mn, Fe, Co, Ni, Cu, Al and Mg. Preferably, the milling is performed for at least 20 hours in a tungsten carbide crucible under an argon atmosphere. It may also be preferable to combine a third base metal oxide to the lithium based mixed oxide, and it may be preferable for that third base metal oxide to be received from the crucible utilized for the high energy milling.

The invention however, is not limited to the above-referenced metals and may include other metal elements suitable for the synthesis of lithium based mixed oxides as may be found in the groups of the periodic table, include in group of IA to IIIB.

BRIEF DESCRIPTION OF THE DRAWINGS

The characteristics of the present invention is presented at.

DESCRIPTION OF A PREFERRED EMBODIMENT

The invention is described further by way of example with respect to the accompanying figures. One skilled in the art will appreciate the methodologies of high energy milling. This milling is preferably performed in a crucible where mecho-mechanical synthesis is performed to synthesize the lithium mixed base oxide. This milling is preferably performed until the lithium based mixed oxide has crystallites preferably in the nanometer range, and more preferably less than one hundred nanometers in dimension.

The formula of $(LiM'_x \ldots O_y)$, when used accounts for the addition of one or more metal elements combined with the Lithium and the (y) molecules of Oxygen, wherein each base metal (M) has (x) molecules. Therefore, the formula of $(LiM'_{x'} \ldots O_y)$, necessarily include the formula of $(LiM'_{x'}M''_{x''} \ldots O_y)$, but is not limited to require more than one additional base metal. Therefore, when discussing a second based metal, that is akin to the M' metal and the third base metal is akin the M" metal.

It should be appreciated that the formulas of $(LiM'_x \ldots O_y)$ necessarily includes the formula of $(LiM'_{x'}M''_{x'''} \ldots O_y)$, as the ( . . . ) indicate additional elements in the formulaic equation.

It is possible to incorporate, or receive, from the crucible, the material of the crucible into the lithium mixed based oxide. For example, a steel crucible may be used to receive or incorporate iron into the lithium mixed based oxide, as discussed subsequently. It is preferable for the crucible to be in a controlled environment. Such a controlled environment assists and prevents undesirable reactions, including reactions with oxygen and the like. Therefore as an anaerobic atmosphere assists in preventing undesirable reactions with oxygen, it can be a suitable controlled environment. Such an anaerobic atmosphere may be an atmosphere of argon gas.

Experimental data has been obtained following the production of lithium mixed base oxide produced in accordance to the method and process of the present invention and should be instructive to the reader.

Experiment I

In the first experiment, the researchers used as starting powders the lithium peroxide $Li_2O_2$ with the cobalt oxide CoO in the right proportion to obtain a total charge of $LiCoO_2$ of 5 grams and the research subjected that mixture to high energy ball milling for 20 hours in a tungsten carbide crucible under argon atmosphere.

Figure 1:
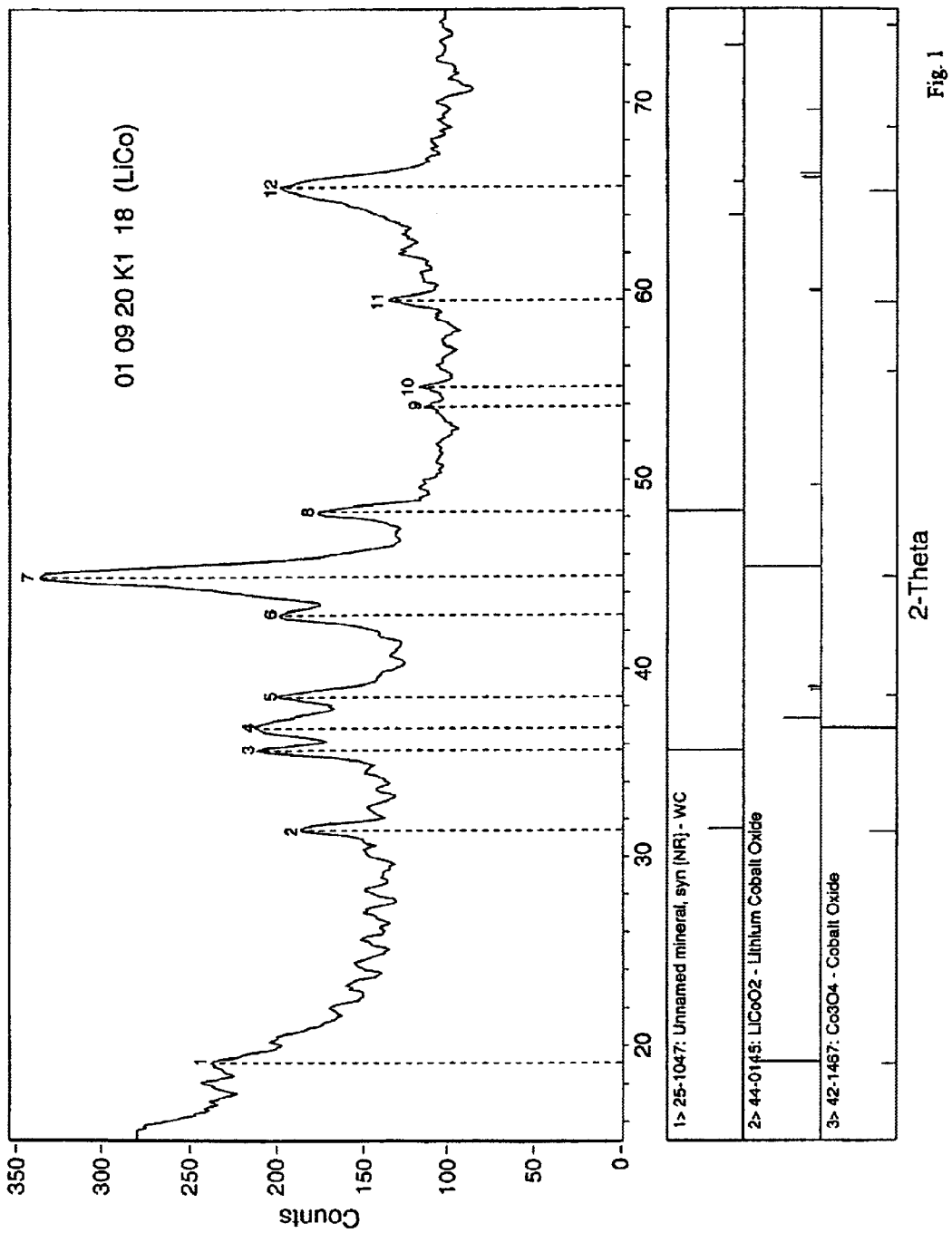
FIG. 1 is an x-ray diffraction pattern (Cu Kα wavelength), shown on a scale of 10° to 80° (2θ), of a sample of the first experiment taken after twenty hours of high energy milling, of $LiCoO_2$.
Figure 2:
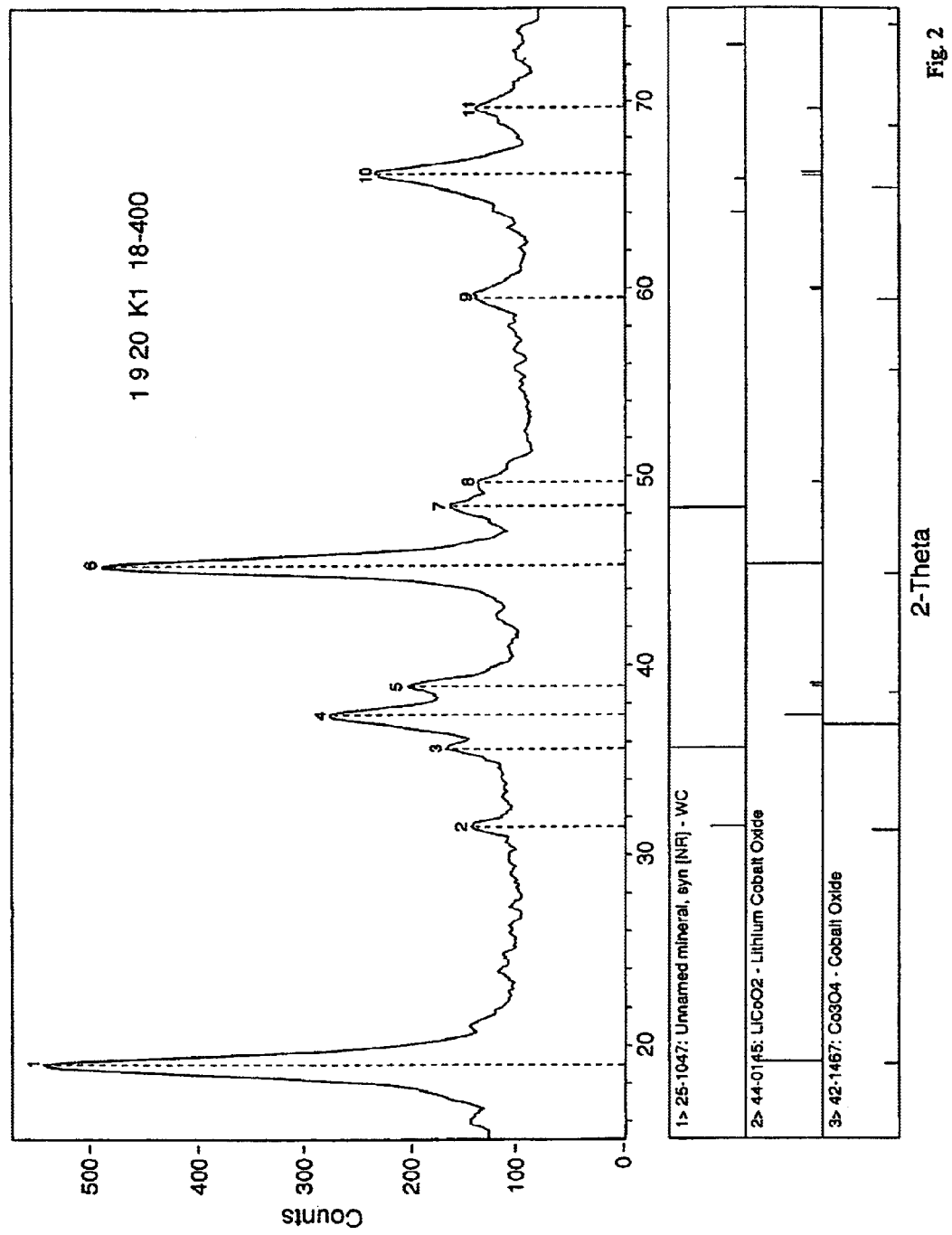
FIG. 2 is the x-ray difractogram of the sample of the first experiment taken after a low temperature relaxation anneal.
Figure 3:
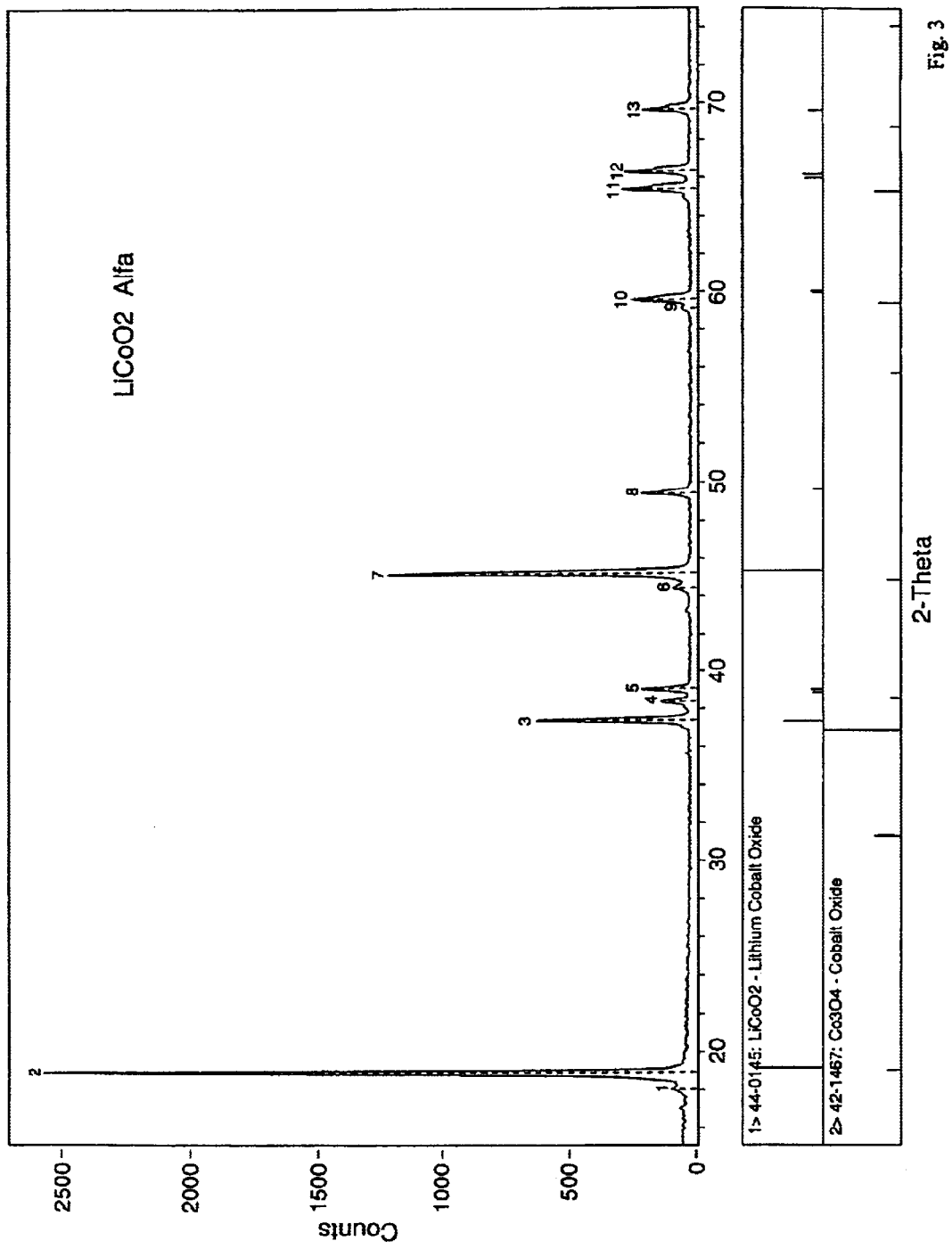
FIG. 3 is the x-ray difractogram of a commercial $LiCoO_2$ from Alfa Aesar.

The X-Ray difractogram of the resulting structure is shown in figure one. Identifiable are the main peaks, characteristic of the structure, even considering that the grain size is extremely small and that the structure is highly disordered by this particular process. In fact this may be of advantage in some cases. FIG. 2 shows the same powder after a low temperature relaxation anneal to reveal more closely the structure of the obtained oxide. In this case, the identification of the product obtained is almost evident when one compares those spectra to the one of FIG. 3 that was taken on the commercial, and well identified, LiCoO2 from Alfa Aesar. The great difference here that has to be noted is the peak widths that are considerably larger in our product and that reveal the nanometer structure well below 50 nanometers.

Experiment II

Figure 4:
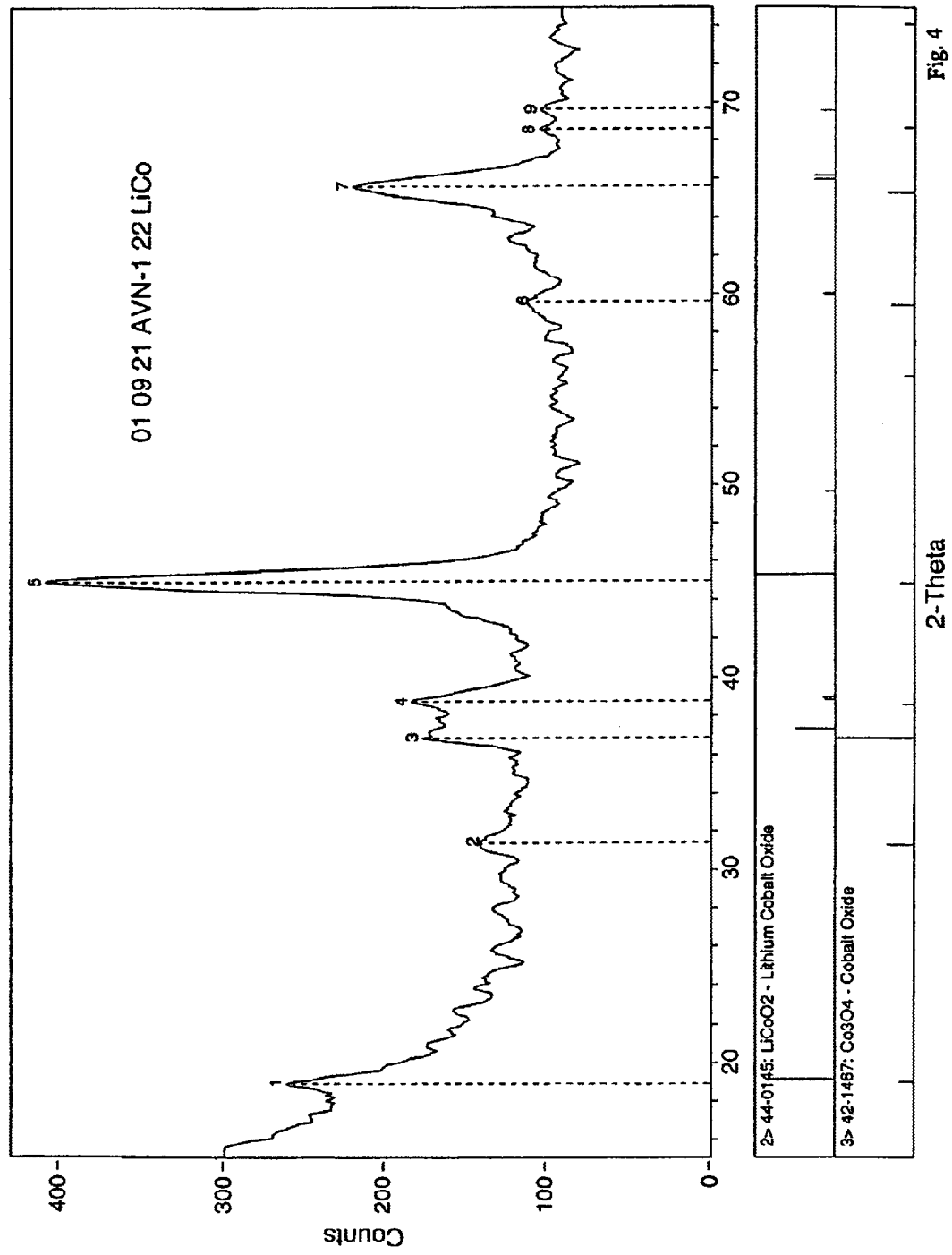
FIG. 4 is the x-ray difractogram of $LiCo_{0.95}Fe_{0.05}O_2$ of the second experiment following high energy ball milling.
Figure 5:
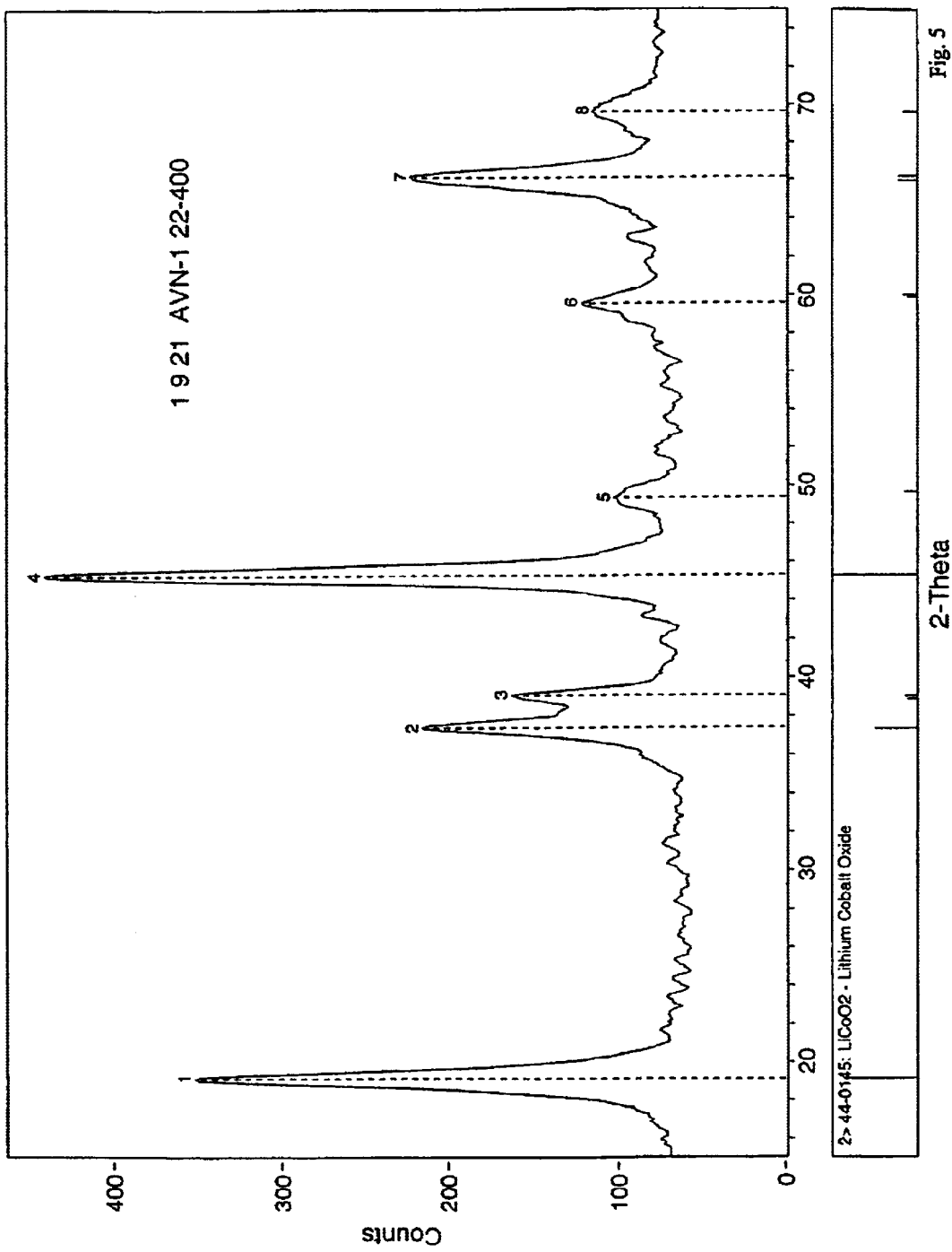
FIG. 5 is the x-ray difractogram of the sample of the second experiment after a relaxation anneal of five hours at 400° Celsius.

In this second experiment, the researchers proceeded in exactly the same way as in Experiment I in preparing the charge, but the milling was done in a steel crucible so that some iron (Fe) was incorporated in the oxide during the milling. The milling was performed for 24 hours in a spex mill at a speed of around 1000 cycles per minute. Upon chemical analysis, the iron content, compared to the cobalt content was around 5 atomic percent which gives a composite formula of $LiCo_{0.95}Fe_{0.05}O_2$. The resulting structure obtained is revealed by its X-Ray difractogram in FIG. 4 just after milling and by FIG. 5 after the relaxation anneal of 5 hours at 400 degrees Celsius. By those spectra, the structure is well identified. Moreover, we may induce also that, in this case, the iron atoms are in solution in the structure.

This type of alloying would have been done as well by addition of metallic iron or its oxides, FeO, $Fe_2O_3$ or $Fe_3O_4$, with a proper adjustment of the overall stoechiometry, including the milling atmosphere that may be adjusted for the oxygen content of the oxide.

While the invention has been described above in relation to a particular embodiment by example, it is to be noted that the invention should not be restricted to the details described above and any other embodiment within the letter and spirit of the present invention is incorporated.

In view of the foregoing, it will be appreciated that the present invention avoids the drawbacks of prior processes and methods of manufacturing lithium mixed base oxides by providing an improved process and method. The specific techniques and structures employed by the invention to improve over the drawbacks of processes and methods of manufacturing lithium mixed base oxides and to accomplish the advantages described above will become apparent from the above detailed description of the embodiments of the invention and the appended drawings and claims. It should be understood that the foregoing relates only to the exemplary embodiments of the present invention, and that numerous changes may be made therein without departing from the spirit and scope of the invention as defined by the following claims.

I claim:

1. A process for producing a lithium based mixed oxide comprising the steps of:

combining a lithium oxide with a second oxide having the base metal element (M'), wherein the combining is performed at room temperature; and applying to the combination, a high energy milling process, wherein the high energy milling process is performed in a substantially anaerobic atmosphere and is performed at substantially room temperature, wherein the high energy milling process obtains, without the addition of substantial external heat being added to the synthesis, a chemical synthesis of a lithium based composite oxide, having crystallites of less than one hundred nanometers in dimension.

2. The process of claim 1 wherein the base metal element (M') is selected from the group consisting of Ti, V, Cr, Mn, Fe, Co, Ni, Cu, Al, and Mg.

3. The process of claim 2 wherein the base metal element (M') is Co.

4. The process of claim 1 wherein the base metal element (M') is Co.

5. The process of claim 1 wherein the lithium based mixed oxide comprises at least two base metal elements.

6. The process of claim 5 wherein the second base metal element (M') is selected from the group consisting of Ti, V, Cr, Mn, Fe, Co, Ni, Cu, Al, and Mg.

7. The process of claim 6 wherein the application of the high energy milling process is performed in a crucible, wherein the crucible walls contain the second base metal element (M").

8. The process of claim 5 wherein the application of the high energy milling process is performed in a crucible, wherein the crucible walls contain the second base metal element (M").

9. A method of manufacturing a lithium based mixed oxide comprising the steps of:

milling a lithium based powder and a second base metal oxide powder in a high energy mill to combine the powders, wherein the milling comprises the steps of:
providing the lithium and metal oxide powders in a substantially anaerobic atmosphere without the addition of substantial external heat,
high energy milling the powders to form a lithium based oxide,
high energy milling the lithium based oxide until the lithium based mixed oxide has crystallites of less than one hundred nanometers in dimension, and
wherein the above steps are performed at substantially room temperature.

10. The method of claim 9 wherein the anaerobic controlled atmosphere is obtained by using Argon gas.

11. The method of claim 9 wherein the second base metal oxide powder has an element selected from the group consisting of Ti, V, Cr, Mn, Fe, Co, Ni, Cu, Al, and Mg.

12. The method of claim 9 wherein the step of high energy milling the lithium based oxide is performed for at least 20 hours in a tungsten carbide crucible under an argon atmosphere.

13. The method of claim 9 wherein the step of combining the lithium based powder and the second base metal oxide powder further comprises the step of:
combining a third base metal oxide.

14. The method of claim 13 wherein the steps of high energy milling are performed in a crucible wherein the crucible is comprised of the third base metal oxide.

15. The method of 14 wherein the crucible is comprised of steel.

16. The method of 9 wherein the second base metal oxide has the element cobalt.

* * * * *